Patented Feb. 20, 1934

1,948,408

UNITED STATES PATENT OFFICE 1,948,408

METHOD OF PREPARING CATALYSTS OF INCREASED ACTIVITY

Rhea N. Watts and William E. Spicer, Baton Rouge, La., assignors to Standard-I. G. Company No Drawing. Application October 16, 1931
Serial No. 569,260

11 Claims. (Cl. 23—236)

The present invention relates to catalytic materials and to the preparation thereof from relatively inactive forms of such substances and more specifically to a method for producing an active form of the heavier metal compounds of the VI group from less active forms.

The catalytic activity of the metals of the VI group of the periodic system of elements and compounds thereof and especially the activity for hydrogenation and destructive hydrogenation is well known, and these metals or their compounds such as oxides, sulfides and nitrides have been used in large scale commercial operation, but heretofore the lighter metals such as molybdenum and chromium have been preferred to the heavier metals, namely tungsten and uranium chiefly because of the fact that the latter are less active and appear to give very erratic results. It has been observed, for example, that tungsten catalysts were sometimes quite active and in other cases of indifferent activity and different lots of catalysts apparently made in substantially the same manner would differ widely in practical tests.

It has been discovered that different forms of these heavy metal oxides possess very different catalytic activity and the present invention deals with a method for insuring the production of the active form of these materials and for converting the less active into the active variety.

Tungstic and uranic acids are generally prepared by heating the corresponding ammonium salts, but unfortunately the acids or oxides so produced are not highly active. We have discovered that these acids are also very difficultly soluble in most mineral acids, but it appears that they are readily soluble in hydrofluoric and phosphoric acids and hydrochloric to a lesser extent. For the purpose of obtaining a solution we prefer to use a strong acid, for example 40% H. F. and 85% $H_3PO_4$ are satisfactory. Temperatures above room temperature also increase solubility and the rate of solution. The active form of the acidic oxide may then be precipitated by the addition of ammonia almost to the neutral point, that is, the alkali is added until the solution contains about 1 to 4% of excess acid and on an average 3% excess acid has been found satisfactory. At the same time it has also been found useful to add a small amount of an oxidizing agent such as nitric acid which increases somewhat the yield of heavy metal oxide.

The precipitated metal oxide may be used as such either alone or in admixture with other substances such as magnesia, alumina, zinc oxide or silica, or active carbon, clay and the like.

In the above description we have illustrated our process by the conversion of a relatively inactive form of the heavy metal oxides to the more active variety and for this purpose hydrofluoric acid is preferred, but our invention embraces the discovery that the chemically precipitated form of these heavy metal oxides is the most active variety and instead of starting with the inactive oxide, soluble salts, such as the ammonium salt of tungstic or uranic acids may be used. These may be dissolved to form a concentrated aqueous solution and the acid, preferably phosphoric, is carefully added so as to bring the solution to the acid strength indicated above, that is to say, to provide 1 to 4% excess acid at which point the active form of the acidic oxides will be precipitated.

We have furthermore discovered that a very active form of sulfide may be produced in the same way, that is, from a soluble form of tungstic or uranic acids produced either from the soluble salts or from the inactive oxide by solution with strong phosphoric acid. For this purpose hydrogen sulfide may be passed through the solution to precipitate the active sulfide or a water soluble sulfide such as ammonium sulfide may be added. All of these forms of tungstic or uranic acids or sulfides thereof are highly active, especially for hydrogenation and destructive hydrogenation and capable of being reproduced with such ease and certainty as is now possible with the lower metal compounds of the VI group. By the term "chemical precipitation" we wish to distinguish from precipitation caused by evaporation of aqueous solution which is a physical process and which results in a less active variety of the heavy metal oxides. The reason or cause for this difference in activity is not certainly known but appears to be connected with the crystal form and not the size of particle.

Our invention is not to be limited by any theory of catalytic activity or to any specific illustration of the manner in which these materials may be produced or used, but only by the following claims in which we wish to claim all novelty inherent in the invention.

We claim:

1. As a hydrogenation catalyst a compound of the heavier metals of the VI group of the periodic system of elements prepared by chemical precipitation from an acid solution containing between 1 and 4% excess acid.

2. As a destructive hydrogenation catalyst a compound from the class of oxides and sulfides of the heavier elements of the VI group of the periodic table prepared by chemical precipitation from an acid solution containing between 1 and 4% excess acid.

3. A hydrogenation catalyst comprising a compound of tungsten produced by chemical precipitation from a solution containing about 3% excess acid.

4. A hydrogenation catalyst comprising a compound of uranium produced by chemical precipitation from a solution containing about 3% excess acid.

5. An improved process for converting higher oxides of heavy metals of the VI group of the periodic system from forms which are relatively inactive for promoting hydrogenation to forms which are more active, comprising dissolving the inactive form of oxide with an acid from the group of phosphoric, hydrofluoric and hydrochloric and precipitating the catalytically active form therefrom by the addition of alkali until the solution contains only 1 to 4% excess acid.

6. An improved method for producing catalytically active tungstic acid from a less active variety comprising dissolving the same in concentrated hydrofluoric acid and adding ammonia until the solution contains only 1 to 4% excess acid whereby the active form of the acid is precipitated.

7. An improved method for producing catalytically active uranic acid from a less active variety comprising dissolving the same in concentrated hydrofluoric acid and adding ammonia until the solution contains only 1 to 4% excess acid whereby the active form of the acid is precipitated.

8. Process according to claim 6 in which precipitation is carried out in the presence of a small quantity of an oxidizing agent.

9. Process according to claim 7 in which precipitation is carried out in the presence of a small quantity of an oxidizing agent.

10. An improved process for producing catalytically active sulfur compounds of heavier metals of the VI group of elements comprising dissolving relatively inactive acidic oxides of such metals in an acid selected from the group consisting of phosphoric and hydrofluoric acids, adjusting the acidity of the solution so that it contains between 1 and 4% excess acid, then precipitating active sulfides by the addition of a water soluble sulfide and separating the precipitate from the mother liquor.

11. An improved process for producing catalytically active sulfur compounds of tungsten comprising obtaining a compound of tungsten in a water soluble form then precipitating the active tungsten sulfide with a soluble sulfide from a solution containing 1 to 4% excess acid and separating the precipitate from the mother liquor.

RHEA N. WATTS.
WILLIAM E. SPICER.